Dec. 4, 1962

D. BENDE 3,067,398

FLEXIBLE CONNECTION FOR WELDING RESISTOR COILS

Filed Jan. 30, 1961

INVENTOR.
DANIEL BENDE

BY

*J. F. Sheehan*
ATTORNEY

United States Patent Office 3,067,398
Patented Dec. 4, 1962

3,067,398
FLEXIBLE CONNECTION FOR WELDING
RESISTOR COILS
Daniel Bende, 1837 W. High St., Haddon Heights, N.J.
Filed Jan. 30, 1961, Ser. No. 85,924
1 Claim. (Cl. 338—319)
(Granted under Title 35, U.S. Code (1952), sec. 266)

The invention described herein may be manufactured and used by or for the Government of the United States of America for governmental purposes without the payment of any royalties thereon or therefor.

This invention relates to welding and particularly concerns apparatus in the form of an assembly of resistors to permit welding operations requiring varying current values and whereby the current requirements may be controlled by the individual welder.

It is old in the art to assemble a group of resistors in a housing and to store a number of the housed assemblies in a framework from which they may be taken by an operator and used in remote area, for example, on shipboard. Each housed assembly of resistors is known in the practical art as a resistor drawer and the drawers are provided with an inlet attachment for a power supply source and an outlet attachment for the welding equipment. Between the attachments and supported by the drawer are the resistors, conductors, controls and other structure whereby an operator can use the assembly in accordance with the power current requirements of a particular use. Due to the contractive and expansive movements of the resistors during use, connections between some of the elements, particularly those between the resistors and the conductors, become separated which causes considerable inconvenience to the operator and loss of time in repair or in obtaining another drawer assembly. This invention is concerned with the connections between the resistors and the conductors or bus bars which carry current through the operator controls to the welding equipment.

An object of the present invention is to provide an improved assembly of resistors for welding units which is of rigid construction and capable of withstanding hard and continuous usage.

Another object of the present invention is to provide an improved resistor assembly of the portable drawer type for mounting the resistors and associated elements which permits expansive and contractive movements of the resistors under varying temperatures without reducing the efficiency of the resistor assembly.

A still further object of the present invention is to provide an improved resistor assembly for welding units of the portable drawer type wherein connections between the resistors and the current output conductors are made substantially permanent under the contractive and expansive movements of the resistors.

FIG. 1 of the drawings is a front elevational view of a drawer assembly for containing a group of resistors and showing manual control elements for the resistors and other structure.

Figure 1:
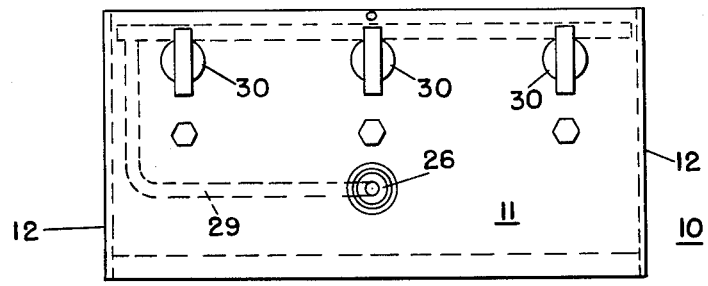
Figure 2:
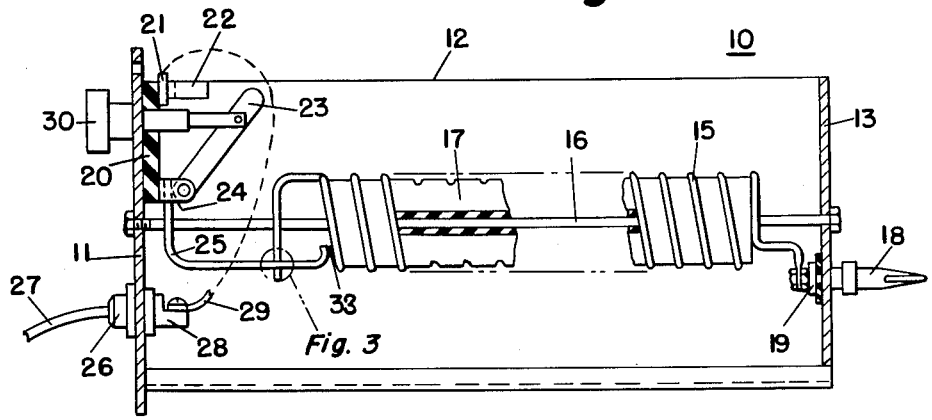
FIG. 2 is a view in elevation of the drawer assembly with a side removed to show an arrangement of a resistor, conductor and cooperating structural elements.

Referring to the drawings, the resistor housing or drawer is indicated generally at 10 and has a front end wall 11, sidewalls 12—12 and a rear end wall 13. A resistor coil is indicated at 15 but it will be understood that this represents an assembly of a group, for example, of three resistors aligned between the sidewalls 12—12. Each resistor coil 15 extends between the front wall 11 and rear wall 13 and is supported on a centering rod 16 which is preferably removably secured in the walls 11 and 13, as shown, by nut means. Insulating spacers 17 extend along the centering rod and are provided with a continuous groove for the reception of the resistors and to provide a relatively rigid mounting therefor. At 18 is indicated a power supply attachment which is to be plugged into a power outlet to supply power to the resistors through a bus bar 19 which extends transversely of the inner face of the rear wall 13 and is suitably insulated therefrom. Each resistor 15 is connected to the rear bus bar 19 and all of the resistors receive power therefrom continuously when the drawer assembly is in use. At the opposite end of the drawer on front wall 11 an insulating panel 20 is mounted and receives equipment for selectively transmitting current through the resistors. To this end a front bus bar 21 extends transversely along the upper edge of panel 20 and has extending therefrom a group of spring clips 22, one for each resistor 15.

A group of switch blades 23 is provided and arranged to coact with the spring clips 22. The lower end of each blade 23 is pivoted in a selected one of a group of three brackets 24 which are secured transversely along the lower portion of the panel 20 in general alignment with the spring clips 22. A group of conductors 25 is provided and arranged to supply current to the switch arms 23 through the brackets 24. For this purpose each conductor 25 has one end fixed to a selected one of the brackets 24 and its other end arranged to be in conducting relation with one of the resistors 15. A single output attachment 26 extends through the front end 11 of the drawer 10 and has its inner end 28 connected to the front bus bar 21 through, for example, a cable connector 29. By operator manipulation of switch handles 30, one resistor or any selected number of resistors 15 can be placed in circuit to transmit the desired current to the welding equipment as the blades 23 are moved into contact with the spring clips 22.

It has been the practice heretofore to connect the resistors 15 and conductors 25 by the simple expedient of a silver or other type of solder connection but this has not withstood extended usage.

Figure 3:
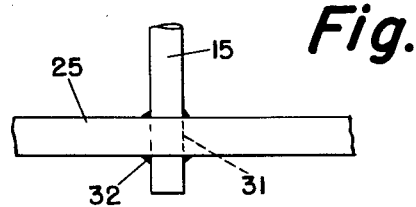
FIG. 3 is an enlarged view of the encircled portion of FIG. 2 showing the detailed structural arrangement of the invention.

In FIG. 3 is shown a detail of the manner of securing a resistor 15 to a conductor 25 which provides a permanent connection for insuring power supply to the welding equipment. The conductors 25 are those used on commercial equipment and are in the form of flat bar material. Each conductor 25 is apertured at 31 to form an opening sufficiently large to permit passage therethrough of the terminal portion of a resistor 15. The diameter of the opening is such as to permit the terminal portion to extend through the conductor a sufficient distance so that physical contact will be constantly maintained between these members regardless of the extent of their movement during contraction or expansion. Preferably the members are positively connected as, for example, by a silver solder connection 32. It has been found in practice that this type of connection is practically permanent since, regardless of the extremes of contractive and expansive movements of the resistors, sufficient contact is maintained between the resistor and conductor to insure current supply to the welding equipment. Additionally, the conductor 25 may be secured to the resistor 15 as shown at 33 as is done in commercial practice.

It will be apparent to those skilled in the art that various changes and modifications may be made to the present disclosure without departing from the spirit of the invention.

I claim:

In apparatus for use in welding operations and comprising a resistor drawer having spaced opposed walls each mounting a transverse bus bar and having a bank of rigidly mounted longitudinal resistor coils between the end walls with one end of each coil fixed in conducting relation with the bus bar on one end wall and a free end portion spaced from the other end wall and wherein a conductor element is provided for each resistor coil and has one end fixed to said other end wall and extends toward the coil with a free end portion disposed adjacent said free end portion of the coil and generally at a right angle thereto, the improvement which comprises an aperture in the free end portion of the conductor, said aperture being sufficiently large to permit passage of the free end portion of the coil therethrough and sufficiently small to maintain the free end portions in conducting relation for transmitting power between the bus bars during contractive and expansive movements of the coil whereby welding operations may be effected under varying temperature conditions.

References Cited in the file of this patent
UNITED STATES PATENTS

| | | |
|---|---|---|
| 401,405 | Benardos | Apr. 16, 1889 |
| 603,027 | Ney | Apr. 26, 1898 |
| 768,332 | Larson | Aug. 23, 1904 |
| 1,478,435 | Him | Dec. 25, 1923 |
| 1,587,996 | Warren | June 8, 1926 |
| 1,702,086 | Loewe | Feb. 12, 1929 |
| 1,724,729 | Ruttenberg et al. | Aug. 13, 1929 |
| 2,701,411 | Paine | Feb. 8, 1955 |
| 2,706,762 | Alexander et al. | Apr. 19, 1955 |